(12) United States Patent
Chatani

(10) Patent No.: US 9,092,513 B2
(45) Date of Patent: Jul. 28, 2015

(54) INFORMATION PROCESSING METHOD, INFORMATION PROCESSING SYSTEM, AND SERVER

(75) Inventor: Masayuki Chatani, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 812 days.

(21) Appl. No.: 12/097,618

(22) PCT Filed: Sep. 8, 2006

(86) PCT No.: PCT/JP2006/317827
§ 371 (c)(1),
(2), (4) Date: Jul. 16, 2008

(87) PCT Pub. No.: WO2007/074559
PCT Pub. Date: Jul. 5, 2007

(65) Prior Publication Data
US 2009/0234840 A1    Sep. 17, 2009

(30) Foreign Application Priority Data

Dec. 26, 2005  (JP) ................................. 2005-372211

(51) Int. Cl.
*G06F 7/00* (2006.01)
*G06F 17/30* (2006.01)

(52) U.S. Cl.
CPC .... *G06F 17/30699* (2013.01); *G06F 17/30654* (2013.01); *G06F 17/30702* (2013.01); *G06F 17/30864* (2013.01); *G06F 17/30867* (2013.01)

(58) Field of Classification Search
CPC ............ A63F 2300/5546; A63F 13/12; A63F 2300/5553; A63F 2300/572; A63F 2300/532; G06F 17/30554; G06F 17/30035

USPC .......... 707/782, 737, 784; 725/97; 705/14.66; 715/744–745
See application file for complete search history.

(56) References Cited

U.S. PATENT DOCUMENTS 6,349,327 B1 * 2/2002 Tang et al. .................... 709/205
6,732,088 B1 * 5/2004 Glance ................................. 1/1
(Continued)

FOREIGN PATENT DOCUMENTS

| JP | 2002024138 | 1/2002 |
| JP | 2002092028 | 3/2002 |

(Continued)

OTHER PUBLICATIONS

Chinese Office Action for corresponding Chinese Patent Application No. 200680047045.8, Jun. 4, 2010.
(Continued)

*Primary Examiner* — Mariela Reyes
*Assistant Examiner* — Linh Black
(74) *Attorney, Agent, or Firm* — Matthew B. Dernier, Esq.

(57) ABSTRACT

A community establishing site is connected to an information terminal via a network. When the user enters a search keyword into the information terminal, an entered-information acquiring unit acquires the search keyword through a web server, and registers it together with user information in a user information master. A community establishing unit extracts users who have entered the same search keyword, from the plurality of users registered in the user information master, and records them in a community information master, thereby establishing a community. An information extracting unit transmits the user information of other users who belong to the same community to the information terminal through the web server.

25 Claims, 12 Drawing Sheets

(56) References Cited

U.S. PATENT DOCUMENTS

| | | | |
|---|---|---|---|
| 7,184,970 B1* | 2/2007 | Squillante | 705/14.27 |
| 2002/0016786 A1* | 2/2002 | Pitkow et al. | 707/3 |
| 2002/0032735 A1* | 3/2002 | Burnstein et al. | 709/204 |
| 2002/0078054 A1 | 6/2002 | Kudo et al. | |
| 2003/0050859 A1* | 3/2003 | Rodriguez et al. | 705/27 |
| 2003/0069799 A1* | 4/2003 | Hoffman et al. | 705/26 |
| 2003/0186208 A1* | 10/2003 | Wen et al. | 434/350 |
| 2004/0064351 A1* | 4/2004 | Mikurak | 705/7 |
| 2004/0249811 A1* | 12/2004 | Shostack et al. | 707/5 |
| 2004/0267816 A1* | 12/2004 | Russek | 707/104.1 |
| 2005/0108001 A1* | 5/2005 | Aarskog | 704/10 |
| 2005/0114528 A1* | 5/2005 | Suito | 709/228 |
| 2005/0137015 A1* | 6/2005 | Rogers et al. | 463/42 |
| 2005/0203807 A1* | 9/2005 | Bezos et al. | 705/26 |
| 2006/0123127 A1* | 6/2006 | Littlefield | 709/229 |
| 2007/0100798 A1* | 5/2007 | Kapur | 707/3 |
| 2008/0005064 A1* | 1/2008 | Sarukkai | 707/3 |

FOREIGN PATENT DOCUMENTS

| | | |
|---|---|---|
| JP | 2002245212 A | 8/2002 |
| JP | 2003281069 A | 10/2003 |

OTHER PUBLICATIONS

International Search Report for PCT/JP2006/317827.

International Preliminary Report on Patentability and Written Opinion for PCT/JP2006/317827.

Hideo Umeki et al., "Supporting Network Community Formation" Keisei Shien, Information Processing Society of Japan, Kenkyu Hokoku, Information Processing of Japan, Nippon, Jul. 11, 2000, vol. 2000, No. 63, pp. 25-30 (Jul. 11, 2000).

European Search Report for corresponding EP Application No. 06797682.9, dated Oct. 28, 2011.

Mika et al., Flink: Semantic Web Technology for the Extraction and Analysis of Social Networks, Web Semantics: Science, Services and Agents on the World Wide Web, Elsevier, vol. 3, No. 2-3 Oct. 1, 2005.

Office Action issued for corresponding Japanese Patent Application No. 2005-372211, dated Sep. 13, 2011.

Office Action issued for corresponding Japanese Patent Application No. 2005-372211, dated Jan. 10, 2012.

* cited by examiner

FIG.4

| | | |
|---|---|---|
| 202 { | KEYWORD 1 (required) | Japanese national soccer team |
| | KEYWORD 2 | Serie A |
| | KEYWORD 3 | transfer |

204 — USE COMMUNITY SERVICE? ■Yes ☐No

206 {
- SEX ■Male ☐Female   AGE  25  YEARS OLD
- JOB  office worker   HANDLE NAME  Micky
- E-MAIL ADDRESS  micky@comservice.co.jp

SUBMIT — 208

| | | |
|---|---|---|
| 302 | USER ID | 001943 |
| 304 | SEX | male |
| 306 | AGE | 25 |
| 308 | JOB | office worker |
| 310 | HANDLE NAME | Micky |
| 312 | E-MAIL ADDRESS | micky@comservice.co.jp |
| 314 | SEARCH DATE | 2006. 11. 15 |
| 316 | KEYWORD(S) | Japanese national soccer team, Serie A, transfer |

| KEYWORD 342 | USER ID 344 |
|---|---|
| Japanese national soccer team | 001943、002048、002989、・・・ |
| Serie A | 000965、001943、002048、・・・ |
| transfer | 001841、001943、002989、・・・ |
| ⋮ | ⋮ |

| KEYWORD 342 | USER ID 344 |
|---|---|
| Japanese national soccer team, Serie A | 001943、002048、・・・ |
| Japanese national soccer team, transfer | 001943、002989、・・・ |
| ⋮ | ⋮ |

| KEYWORD 342 | USER ID 344 |
|---|---|
| Japanese national soccer team, Serie A, transfer | 001943 |
| ⋮ | ⋮ |

| | | |
|---|---|---|
| 402 | USER ID | 003121 |
| 404 | SEX | Female |
| 406 | AGE | 32 |
| 408 | JOB | private college lecturer |
| 410 | HANDLE NAME | Bestteacher |
| 412 | E-MAIL ADDRESS | teacher@telserv.co.jp |
| 414 | LAST ACCESS SITE | http://www.stock-info.co.jp/ |
| 416 | ACCESS DATE | 2006. 12. 12 |
| 418 | KEYWORD(S) | stock transactions, day trading, finance company with small commissions |

400

INFORMATION PROCESSING METHOD, INFORMATION PROCESSING SYSTEM, AND SERVER

FIELD OF THE INVENTION

The present invention relates to information processing technologies, and in particular, to an information processing method for providing and receiving services through a network, and an information processing system and a server which use the method.

BACKGROUND

In recent years, search services provided through a network such as the Internet have become popular. To receive the search service, the user uses, for example, an information terminal to enter one or more keywords and then send the keyword(s) to a website providing the search service through the network. The search service website detects a website, which provides information source containing the keyword(s) sent from the user, according to a predetermined algorithm, and this allows the user to browse the uniform resource locator (URL) and the like of the website on a screen of the information terminal.

Conversely, there are community sites, which are websites that provide services for information exchange among users who have interests and attributes in common and the like. When accessing a community site concerning their interests, users can share information with others by using services such as chat or electronic bulletin board, and obtain wanted information by further accessing other websites concerning their interests which are linked to the community site (see Patent Document 1, for example). [Patent Document 1] Japanese Patent Application Laid-Open No. 2002-92028

Information exchange and communication of an interest between users are performed by a typical process: searching for websites on a search site, surveying the list of resultant websites, specifying a community site or a related website by oneself, and accessing it. However, there are numerous websites in the world today, and accordingly, in many cases, extracting sites which provide the wanted information exchange from many website hits as a search result requires significant efforts. Moreover, there may be no site concerning wanted matters because community sites and electronic bulletin boards are set up with regard to individual user's or companies' own requirements.

SUMMARY OF THE INVENTION

The present invention has been made in view of the aforementioned problems and a general purpose thereof is to provide a technology capable of allowing the user to easily participate in a community.

One embodiment of the present invention relates to an information processing method. The information processing method includes: acquiring data through a network by a server, the data having been entered into an information terminal by a user; storing a plurality of pieces of the data entered by a plurality of users; establishing, by extracting a plurality of pieces of data having relevance between a plurality of different users from the stored pieces of data, a community for the users that have entered the extracted pieces of data; and presenting information concerning the community to the user.

In this instance, the "data" may include any event caused by a user using the information terminal, such as various signals and network disconnections caused by a selected input entered with a pointing device, as well as text data. The "relevance" may show data with conflicting features, as well as identical data or data with a strong relationship, and the relevance may be set arbitrarily depending on data type or embodiment. The "information concerning the community" may include information on the data itself, for example, the number of pieces of data, and distribution of data, or it may include the user information of a user group entering the data, for example, an e-mail address or addresses, access status of a current network, or attributes such as sex and job, avatar, or game character. The information concerning the community may also be set arbitrarily depending on the data type or embodiment.

Another embodiment of the present invention relates to an information processing system. The information processing system includes: an information terminal into which a user enters data; and a server which provides information to the information terminal through a network. The server includes: a data acquiring unit which acquires the data entered into the information terminal; a data storage unit which stores pieces of the data acquired by the data acquiring unit; a community establishing unit which establishes, by extracting a plurality of pieces of data having relevance between a plurality of different users from the pieces of data stored in the data storage unit, a community for the users who have entered the extracted pieces of data; and a transmitting unit which transmits information concerning the community established by the community establishing unit to the information terminal.

Yet another embodiment of the present invention relates to a server. The server includes: a user information storage unit which stores information concerning a user as user information, the user operating an information terminal connected to the server through a network; a data acquiring unit which acquires the data entered into the information terminal by the user; a data storage unit which stores the data acquired by the data acquiring unit so as to associate the data with the user information of the user who has entered the data in the data storage unit; a community establishing unit which establishes, by extracting a plurality of pieces of data having relevance between a plurality of different users from the pieces of data stored in the data storage unit, a community for the users who have entered the extracted pieces of data; and a transmitting unit which transmits, to the information terminal operated by a user who participates in the community established by the community establishing unit, the user information of the other users who participate in the community.

Arbitrary combinations of the aforementioned constituting elements, and implementations of the invention in the form of methods, apparatuses, systems, and computer programs may also be practiced as additional modes of the present invention.

The present invention makes it possible to facilitate the establishment of communities in information space formed by the network.

BRIEF DESCRIPTION OF DRAWINGS

FIG. 4 shows one example of a screen which appears to allow the user to enter a search keyword or search keywords and the like into the information terminal in the first embodiment;

FIG. 5 shows one example of a data structure of user information registered in a user information master by the community establishing server in the first embodiment;

FIG. 6 shows one example of a data structure of community information recorded in a community information master when the community establishing server establishes a community in the first embodiment;

FIG. 7 shows one example of a data structure of community information recorded in a community information master when the community establishing server establishes a community in the first embodiment;

FIG. 8 shows one example of a data structure of community information recorded in a community information master when the community establishing server establishes a community in the first embodiment;

FIG. 19 shows one example of a data structure of user information registered in the user information master by the community establishing server in the third embodiment.

DESCRIPTION OF REFERENCE NUMERALS

20: Information terminal, 40: Network, 50: Community establishing site, 52: Web server, 60: Community establishing server, 62: Entered-information acquiring unit, 64: Site search unit, 66: Community establishing unit, 68: Information extracting unit, 80: Database storage unit, 82: Website information master, 84: User information master, 86: Community information master

DETAILED DESCRIPTION OF THE INVENTION

First Embodiment

Figure 1:
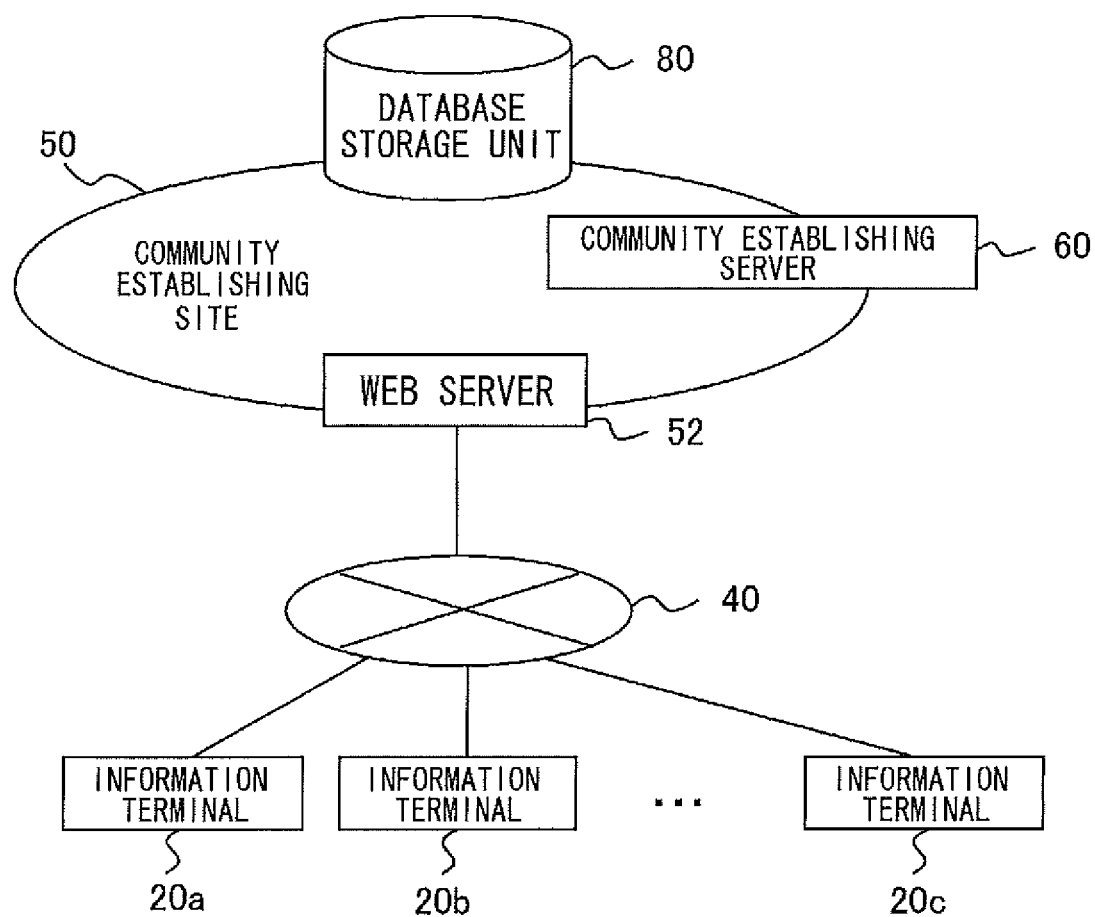
FIG. 1 is a diagram showing an entire configuration of an information processing system according to a first embodiment.

FIG. 1 shows an entire configuration of an information processing system according to this embodiment. The information processing system 100 includes a plurality of information terminals 20a to 20c which are connected to a network 40 such as the Internet via wired or wireless connections, and a community establishing site 50 which provides a community establishing service to the information terminals 20a to 20c via the network. The information terminals 20a to 20c are not limited to three terminals, and hereinafter will collectively be referred to as the information terminal 20. The community establishing site 50 also serves as a search site as well in the present embodiment, however it may also be separate from a site for providing a search service, as long as the community establishing site 50 can acquire a search keyword or keywords entered by a user who operates the information terminal 20 (hereinafter simply referred to as the user).

The community establishing site 50 includes: a web server 52; a community establishing server 60; and a database storage unit 80. The web server 52 provides an interface for allowing a user to use a search service and a community establishing service. For example, it makes a screen for receiving the entry of site search keyword(s), search results, and the information of the other users who are members of the established community, to be displayed on the information terminal 20. The web server 52 serves as a mail server for delivering e-mails and a server for providing an electronic bulletin board service, as well. The community establishing server 60 groups the users based on the information entered into the information terminal 20 by the users, thereby establishing a community. The community establishing server 60 also has functions such as a keyword search, a directory search, and the like. The database storage unit 80 stores not only information on the established community but also user information provided to the members of the community, indices required to perform the search function, and the like, as database.

Figure 2:
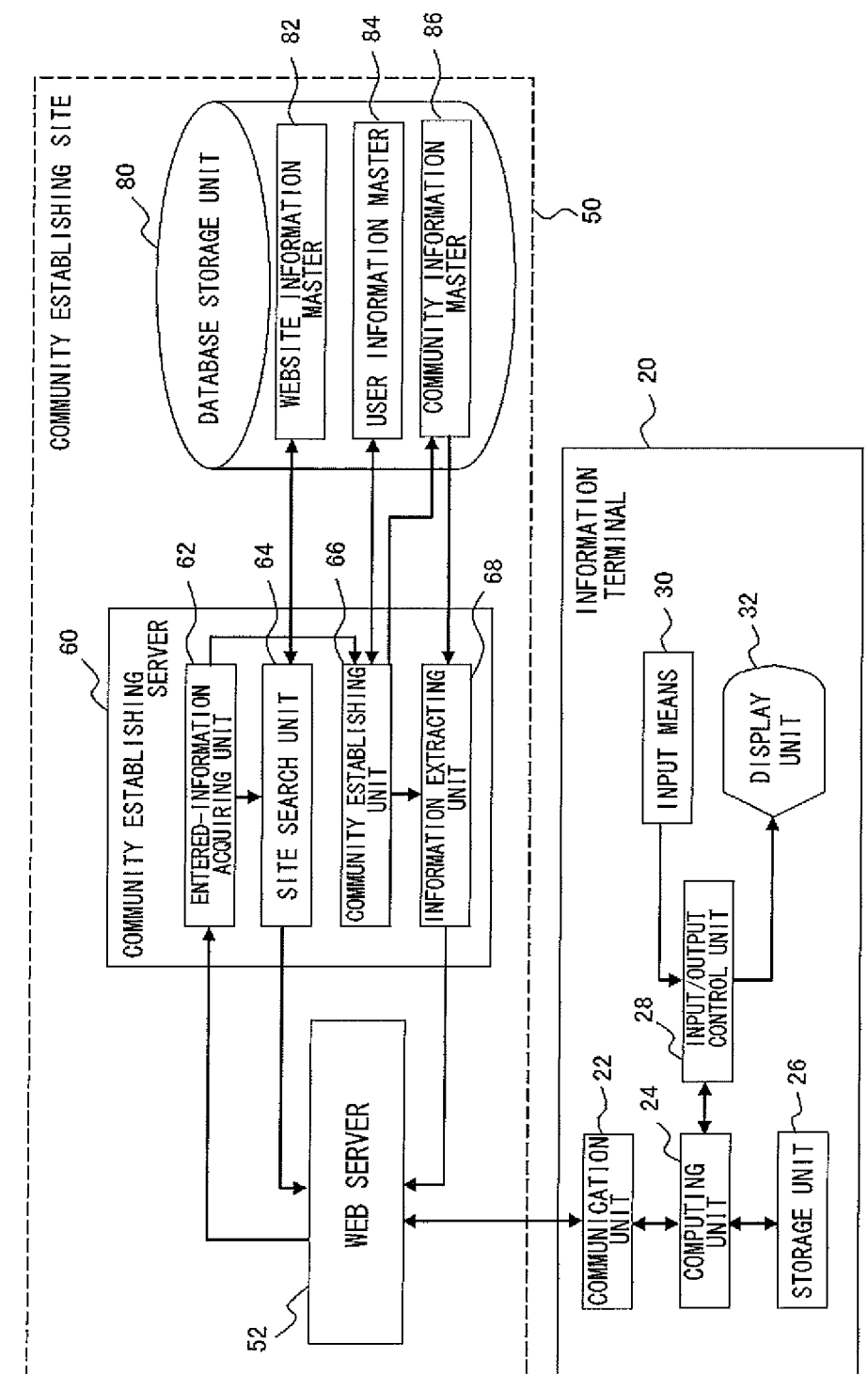
FIG. 2 is a diagram showing configurations of a community establishing site and an information terminal in the first embodiment.

FIG. 2 shows detailed configurations of the community establishing site 50 and the information terminal 20. With reference to FIG. 2, the components described as functional blocks for performing various processes can be provided as hardware, for example, CPU, memory, and other LSI, and can be implemented as software, for example, browser and network programs. Accordingly, those skilled in the art will recognize that the functional blocks can be implemented as various configurations with, but not limited to, hardware-only, software-only, or hardware and software combination systems.

The community establishing server 60 of the community establishing site 50 includes: an entered-information acquiring unit 62 which acquires a search keyword entered by the user; and a site search unit 64 which searches a website information master 82 of the database storage unit 80 for a website based on the search keyword. The entered-information acquiring unit 62 has the function of acquiring not only the search keyword but also user information of the users participating in the community, and also has the function of obtaining the network access status of the information terminal 20, such as the URL of a website currently accessed by the information terminal 20. The network access status of the information terminal 20, for example, is used for obtaining the status of other members when a user participates in the established community, as described later.

The community establishing server 60 further includes: a community establishing unit 66 which establishes a community to which multiple users belong; and an information extracting unit 68 which extracts information to be provided to the users who are community members. The community establishing unit 66 registers the search keyword acquired by the entered-information acquiring unit 62 in the user information master 84 of the database storage unit 80 so as to associate the search keyword with the identifier of the user who has entered the search keyword. The community establishing unit 66 also extracts the users who have entered similar search keywords from the user information master 84 to group the users, and thus registers the group in a community information master 86, thereby establishing a community.

The information terminal 20 comprises: a communication unit 22 which communicates with the community establishing site 50 via the network 40 shown in FIG. 1; a computing unit 24 which mainly executes software such as a browser; a storage unit 26 which stores data required for programs and processes by the computing unit 24; an input unit 30 which allows the user to enter a search keyword or search keywords and the like; a display unit 32 which displays webpages and the like; and an input/output control unit 28 which controls input/output of the input unit 30 and the display 32. The storage unit 26 may include any of a storage device and a recording medium which are generally used, such as memory, a hard disk, or CD-ROM, however, the storage unit 26 is represented as one general block in the drawing. The input unit 30 may be any of input devices which are generally used, such as a keyboard, a button, or a pointing device.

Figure 3:
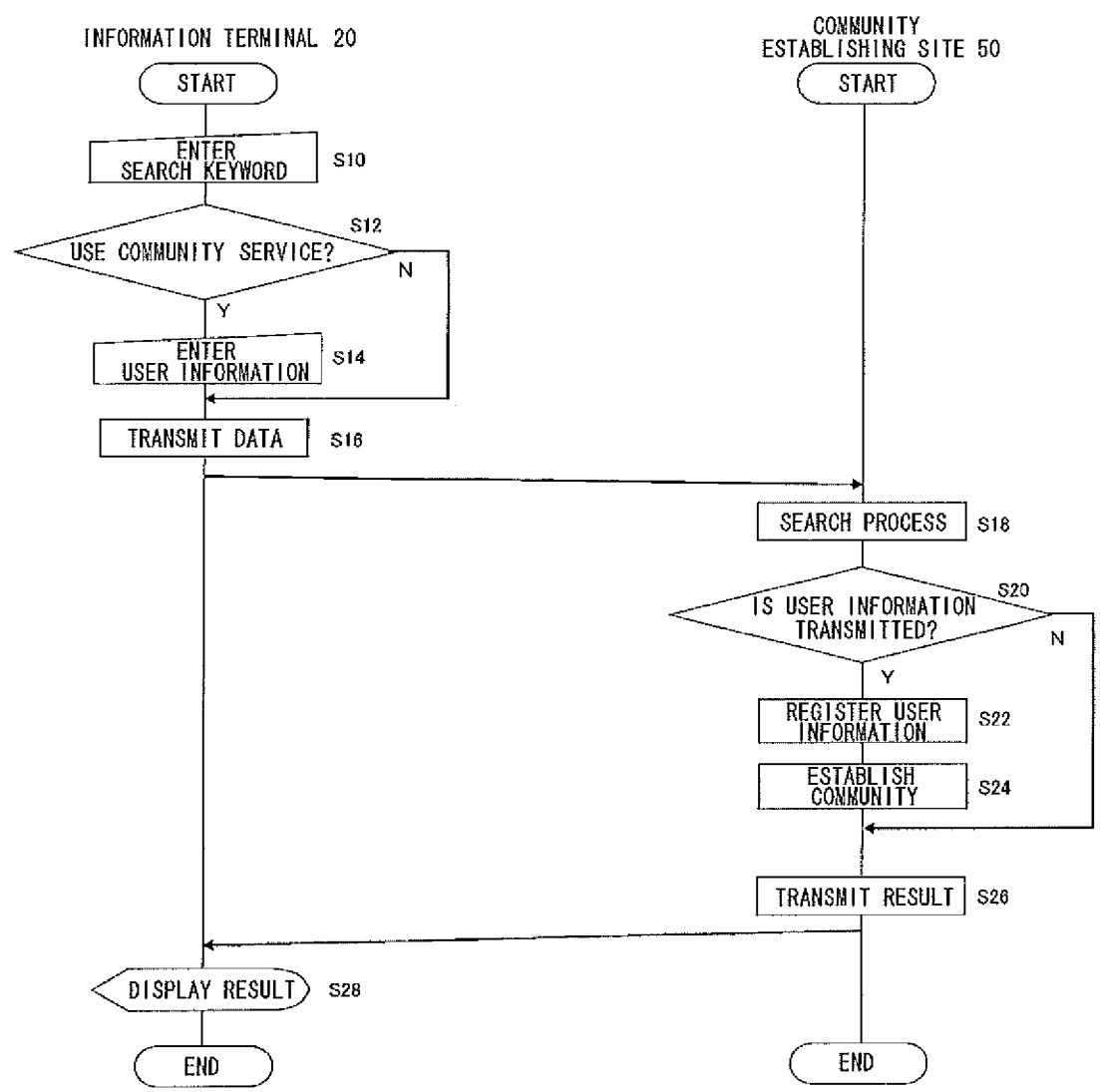
FIG. 3 is a flowchart showing operating procedures of the information terminal, a community establishing server, and a web server in the first embodiment.

The operation of the information processing system, configured as described above, will be described below. FIG. 3 is a flowchart showing operating procedures of the information terminal 20, the community establishing server 60 and a web server 52 of the community establishing site 50. The user first browses the community establishing site 50 using the information terminal 20, and then enters a search keyword or search keywords on a search reception screen which appears on the display unit 32 using the input unit 30 (S10). At the same time, the user performs an input for confirmation as to whether to use the community establishing service (S12). If the user decides to use the community establishing service (Y at S12), an entry screen to enter user information appears and the user follows the screen to enter information such as his/her e-mail address (S14). As will be described later, the screen for confirming the use of the community establishing service and the screen for entering user information may appear on the same screen together with the search reception screen, or may appear separately using, for example, a pop-up window. If the user decides not to use the community establishing service (N at S12), only the keyword(s) entered at S10 is transmitted to the community establishing site 50 in response to the user's determined input. If the user decides to use the community establishing service (Y at S12), the keyword(s) entered at S10 and the user information entered at S14 are transmitted to the community establishing site 50 in response to the user's determined input (S16).

Conversely, in the community establishing site 50, when the web server 52 receives the data transmitted from the information terminal 20, the entered-information acquiring unit 62 acquires the search keyword(s) contained in the data and the site search unit 64 performs search processing (S18). At this time, the URLs and the priority of the webpages containing the search keyword(s) are extracted from the website information master 82 stored in the database storage unit 80, and thus the search processing is performed following a predetermined algorithm. However, a preferable specific manner therefor may be selected accordingly but not mentioned here. The entered-information acquiring unit 62 then checks whether the data transferred from the information terminal 20 includes user information (S20). If the data includes user information (Y at S20), the community establishing unit 66 determines that the user wants to use the community establishing service, and registers the user information in the user information master 84 so as to associate the user information with the search keyword(s) and the identifier unique to that user (S22). If the user information of the user has already been registered, the search keyword(s) which has been associated with the user is simply updated to the newly entered search keyword(s).

The community establishing unit 66 then extracts a plurality of users who have entered the same search keyword, for example, as community members from the user information registered in the user information master 84. The identifiers of the extracted users are associated with the same search keyword, registered in the community information master 86, thereby establishing a community (S24). If the community corresponding to the keyword has already been established, the user identifier may be simply added as a new member. As will be described later, there may be a plurality of communities which allow the user to participate if the user enters a plurality of keywords at one time, for example.

After that, the information extracting unit 68 extracts information of the other users who belong to a community, being one of the communities registered in the community information master 86, the member of which is the user of the information terminal 20, and transmits the information together with the search result at S18 to the information terminal 20 (S26). If the data transmitted from the information terminal 20 includes no user information at S20, in other words, if the user does not use the community establishing service, only the search result is transmitted at S26.

The communication unit 22 of the information terminal 20 receives the search result and the user information of the other users who belong to the community. Browser processing is then performed in cooperation with the computing unit 24, the storage unit 26, and the input/output control unit 28, and thus the browsing result appears on the display unit 32 (S28).

Processing after the community is established at S26 and S28 may be phased practically. In other words, the community establishing site 50 first gives the information terminal the search result and the notification of establishing the community only. The information terminal 20 displays a screen which allows the user to enter for selection of information wanted about the established community, as well as displaying the search result. For example, when a plurality of search keywords entered by the user cause a plurality of communities to be established or allow the user to participate in a plurality of communities, the screen prompts the user to select a community or communities in which he/she wants to participate. Furthermore, the screen prompts the user to select which service for the selected community to use. As will be described later, in the selection of the community, the feature of the community, such as the relevance of the plurality of keywords entered and a keyword associated with the community, is displayed to help the user's selection. The service for the community allows the user to select a wanted service from, for example, a service displaying a piece of user information of the other members such as an e-mail address, or an electronic bulletin board which allows only the members to access it.

The result of the user's selection is transmitted from the information terminal 20 to the community establishing site 50. The community establishing site 50 transmits the selected information from the selected community to the information terminal 20. The information terminal 20 performs browsing processing based on the received information, so that a list of the user information of the members, an electronic bulletin board, or the like appears accordingly.

FIG. 4 shows one example of a screen which appears on the display unit 32 to allow a user to enter the search keyword(s) and the like into the information terminal 20. A search reception screen 200 includes keyword fields 202, selection boxes for using the community establishing service 204, user information fields 206, and a data submission button 208. The user enters a search keyword or search keywords in the keyword fields 202 in the same manner as undertaking a general keyword search. With reference to FIG. 4, three keywords, "Japanese national soccer team," "Serie A," and "transfer," are entered as one example. The user decides whether to use the community establishing service by selecting one of the selection boxes for using the community establishing service 204.

When deciding to use the community establishing service, the user enters into the user information fields his/her information such as sex, age, job, handle name, and e-mail address, as shown in FIG. 4. The handle name is his/her nickname used on the network to allow network communication without showing his/her real name. The user may choose not to enter a piece of information which he/she does not want to show at the establishment of the community. When the user decides not to use the community establishing service by checking the selection box for using the community establishing service 204, the entry in the user information fields 206 is disabled. The entered data is transmitted from the information terminal 20 to the community establishing site 50 when the user selects the data submission button 208.

FIG. 5 shows one example of a data structure of user information to be registered in the user information master 84 by the community establishing server 60 at S22. A user information table 300 includes a user ID field 302, sex field 304, age field 306, job field 308, handle name field 310, e-mail address field 312, search date field 314, and keyword field 316. FIG. 5 shows examples of fields, and the user information table 300 may include a further field for user property. The user ID entered in the user ID field 302 is an identifier unique to the user, assigned by the community establishing server 60. The user information including sex, age, job, handle name, and e-mail address, which are entered on the search reception screen 200 by the user, are registered in the sex field 304, age field 306, job field 308, handle name field 310, and e-mail address field 312, respectively.

In addition to this, the date when a last search keyword or last search keywords was entered and the entered search keyword(s) are registered in the search date field 314 and keyword field 316, respectively. The community establishing server 60 determines based on the user information whether the data transmitted from the information terminal 20 is by a user who has been registered or by a new user. If the data is by the user who has been registered, only the search date field 314 and keyword field 316 of the user information table 300 of that user are updated. Alternatively, the community establishing server 60 may notify a new user of the user ID in advance to prompt the user to enter the user ID together with the search keyword(s) when the subsequent services are used. In this case, the community establishing server 60 can update only the search date field 314 and keyword field 316 by detecting the user information table 300 of the user corresponding to the user ID transmitted from the information terminal 20.

FIGS. 6 to 8 show examples of the data structure of community information recorded in the community information master 86 when the community establishing server 60 establishes a community by extracting the user based on the keyword(s). With reference to these figures, FIG. 6 shows a community information table 340a when a community is established based on a single keyword; FIG. 7 shows a community information table 340b when a community is established based on two keywords; and FIG. 8 shows a community information table 340c when a community is established based on three keywords. The community establishing server 60 may create a plurality of community information tables 340a to 340c in response to one entry, as shown in these examples. Any of the community information tables 340a to 340c may include keyword fields 342 and user ID fields 344.

For example, a community for the users who have searched with a keyword or keywords including "Japanese national soccer team," which is shown in the keyword field 342, is established in the first line of the community information table 340a shown in FIG. 6. This figure shows that the users who are identified by the user IDs which are recorded in the user ID fields 344 respectively as "001943," "002048," and "002989" are extracted as members. FIG. 6 also shows a community for the users who have entered a keyword or keywords including "Serie A" and a community for the users who have entered a keyword or keywords including "transfer." The user corresponding to the user ID "001943" registered with the user information shown in FIG. 5 is recorded as the member in the corresponding three communities because the user has searched with the keywords "Japanese national soccer team," "Serie A," and "transfer."

Conversely, in the community information table 340b of FIG. 7, the user community having two keywords in common, for example, the community for the users who have searched with the keywords including "Japanese national soccer team" and "Serie A," is recorded. In the community information table 340c of FIG. 8, the user community having three keywords in common is recorded. Note that the example shown in FIG. 8 does not form a community because only one user has entered the three keywords "Japanese national soccer team," "Serie A," and "transfer." The greater the number of keywords used for establishing a community, the closer the interests of the community. Hereinafter, the community which is established with a single keyword is referred to as a low relevance community, the community which is established with two keywords is referred to as a middle relevance community, and the community which is established with three keywords is referred to as a high relevance community.

As described above, in response to a new keyword or new keywords transmitted from the information terminal 20, the community establishing server 60 updates the search date field 314 and keyword fields 316 of the user information table 300 of that user who has transmitted the keyword(s) if the user has already been registered in the user information master 84. The community establishing server 60 further deletes the user ID of the corresponding user from the community established with the keyword(s) before updating, in the community information table 340 of the community information master 86. The community establishing server 60 then adds the user ID of the corresponding user to the community established with the keyword(s) after the updating. Accordingly, the member of the community is traded automatically and communities are continued to be dynamically established according to the latest entry. The user whose user information table 300 is not updated in the search date field 314 and keyword fields 316 because of no search undertaking during a predetermined period may be automatically deleted from the list of community members.

Figure 9:
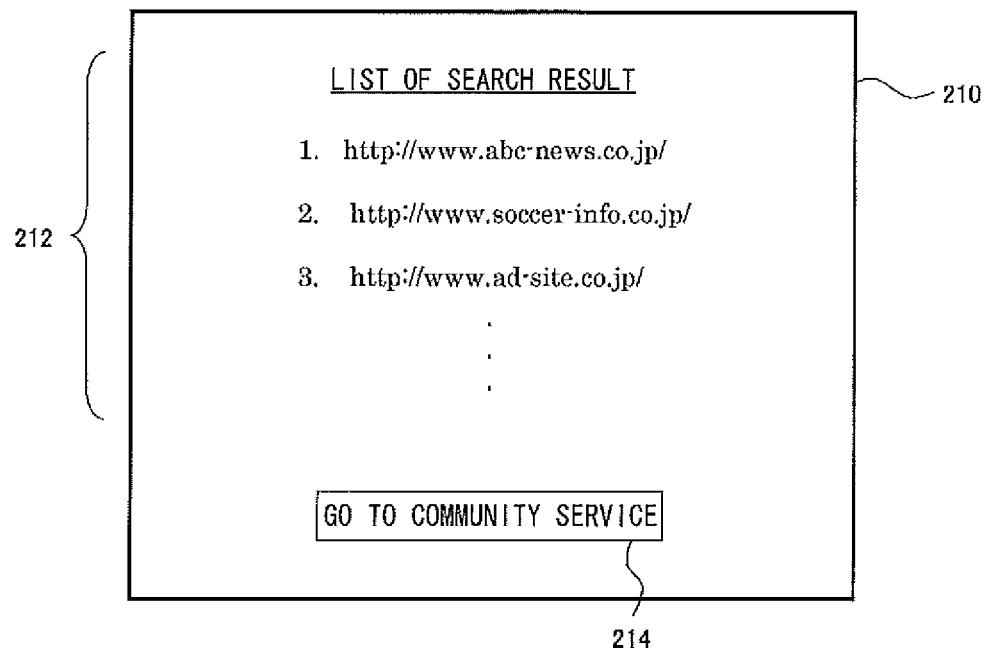
FIG. 9 shows one example of a screen which shows search results or community establishing results transmitted by a community establishing site on the information terminal.

FIG. 9 shows one example of a screen which shows search or community establishing results transmitted by the community establishing site 50 on the display unit 32 of the information terminal 20. A search result display screen 210 includes a search result display area 212 and a community service screen jump button 214. A URL list of websites, being network search hits as a result of the keyword search, appears in the search result display area 212. When the user selects one of the URLs, the webpage of the selected URL appears on the display unit 32. Conversely, when the user selects the community service screen jump button 214, a screen which allows the user to select a wanted community appears on the display unit 32. If any of the entered keywords cannot form a community, a dialog with a message of 'no community' may appear instead of the community service screen jump button 214.

Figure 10:
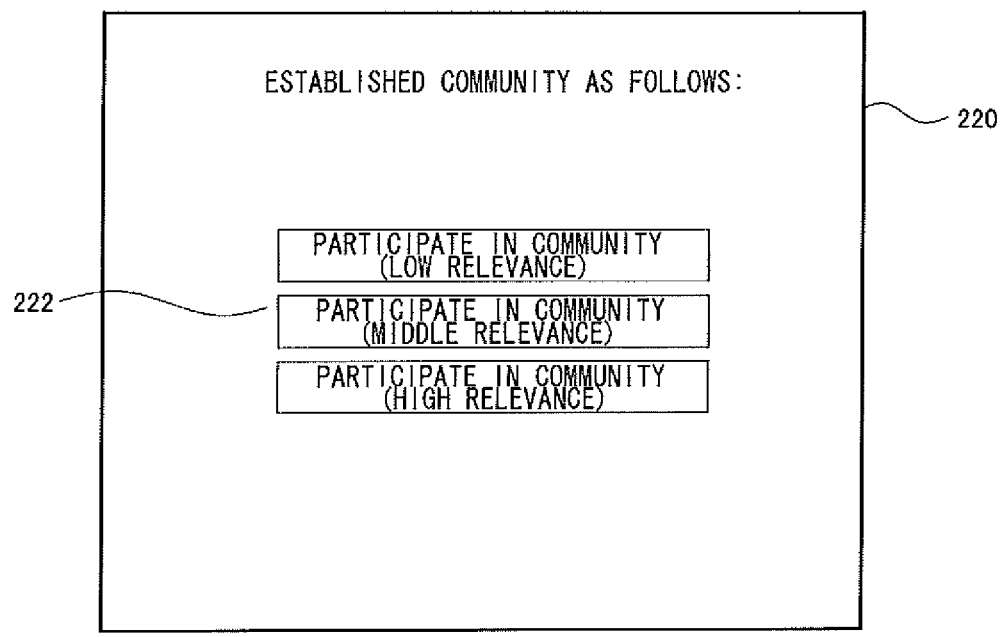
FIG. 10 shows one example of a screen which appears to allow the user to select a community on the information terminal in the first embodiment.
Figure 11:
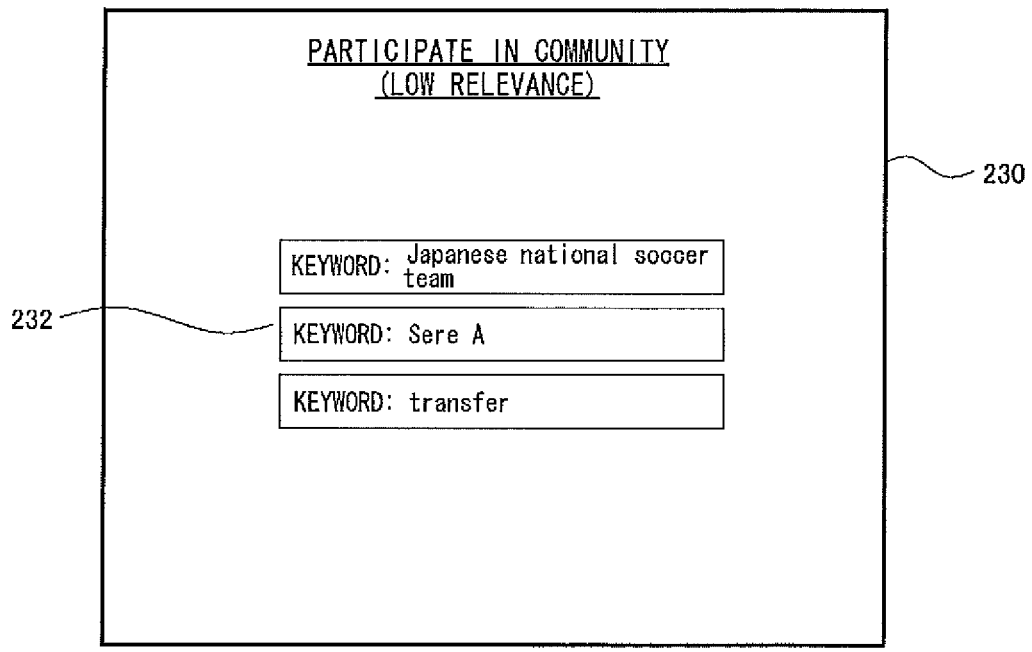
FIG. 11 shows one example of a screen which appears on the information terminal to allow the user to select a community in the first embodiment.

FIGS. 10 and 11 show examples of community selection screens which appear on the display unit 32 when the user selects the community service screen jump button 214 on the search result display screen 210 shown in FIG. 9. FIG. 10 shows one example of a screen which allows the user to select a community relevance as the first selection step. A relevance selection screen 220 includes a community relevance selection button 222. As described above, the user who has first entered a plurality of search keywords may participate in a plurality of communities according to each keyword or the combination of such. Therefore, narrowing the communities is first performed by selecting a wanted relevance. The example shown in FIG. 10 allows the user to select one of low, middle, and high relevance communities, and in response to the result of selection, the community is narrowed to one of, for example, the community information tables 340a, 340b, and 340c shown in FIGS. 6 to 8.

FIG. 11 shows one example of a screen which allows the user to select one of the plurality of communities, which has been narrowed based on the relevance, as the second selection step. The community selection screen 230 includes community selection buttons 233. FIG. 11 shows the screen when the user selects the "low relevance" community on the relevance selection screen 220 shown in FIG. 10, in other words, the community established by a single search keyword. Accordingly, the community selection buttons 232 allow the user to select one of three communities which are established respectively by the search keywords "Japanese national soccer team," "Serie A," and "transfer." The user decides on only one community, in which he/she wants to participate, by selecting one of the community selection buttons 232.

When the user selects the "middle relevance" community on the relevance selection screen 220 shown in FIG. 10, the community selection buttons 232 on the community selection screen 230 of FIG. 11 appear to allow the user to select one of three communities which are established respectively by three keyword pairs, "Japanese national soccer team" and "Serie A," "Japanese national soccer team" and "transfer," and "Serie A" and "transfer." When the user selects the "high relevance" community on the relevance selection screen 220 shown in FIG. 10, no community selection screen 230 appears because the corresponding community is determined to be only one. As described above, note that the example shown in FIG. 8 does not form a community because only one member has entered the three keywords "Japanese national soccer team," "Serie A," and "transfer." In this case, a dialog with a message of 'no community' may appear to prompt the user to select another relevance.

Figure 12:
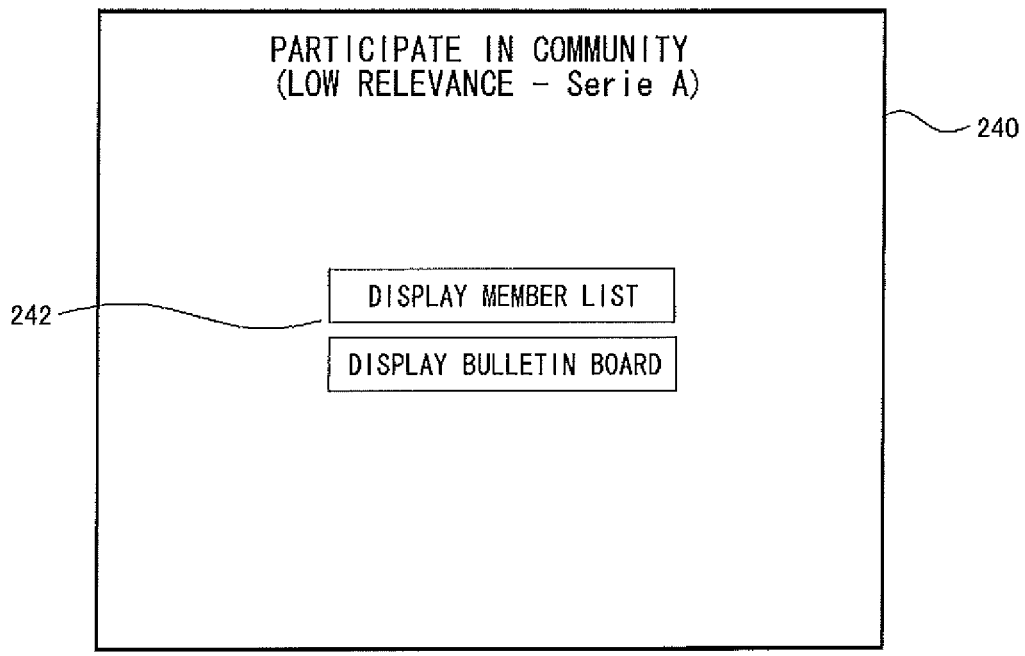
FIG. 12 shows one example of a screen which appears on the information terminal to allow the user to select a service provided by the established community in the first embodiment.

FIG. 12 shows one example of a screen which appears to allow the user to select a service provided by the community which has been selected on the selection screens shown in FIGS. 10 and 11 by the user. A service selection screen 240 includes a service selection button 242. This example allows the user to select a list of the user information of the other users who belong to the community or an electronic bulletin board used by the community members, as the service provided by the community establishing site 50.

As described above, the community and service selected using the information terminal 20 is transmitted to the community establishing site 50. The community establishing server 60 detects a corresponding community from the community information master 86 based on the transmitted data. The community establishing server 60 then extracts user information from the user information master 84 based on the user ID of the user who belongs to the community. The web server 52 formats the data accordingly so that the extracted user information appears on the display unit 32 of the information terminal 20 in a form suitable for the selected service, and then transmits the data to the information terminal 20. At the same time, the web server 52 establishes a new electronic bulletin board as necessary.

Figure 13:
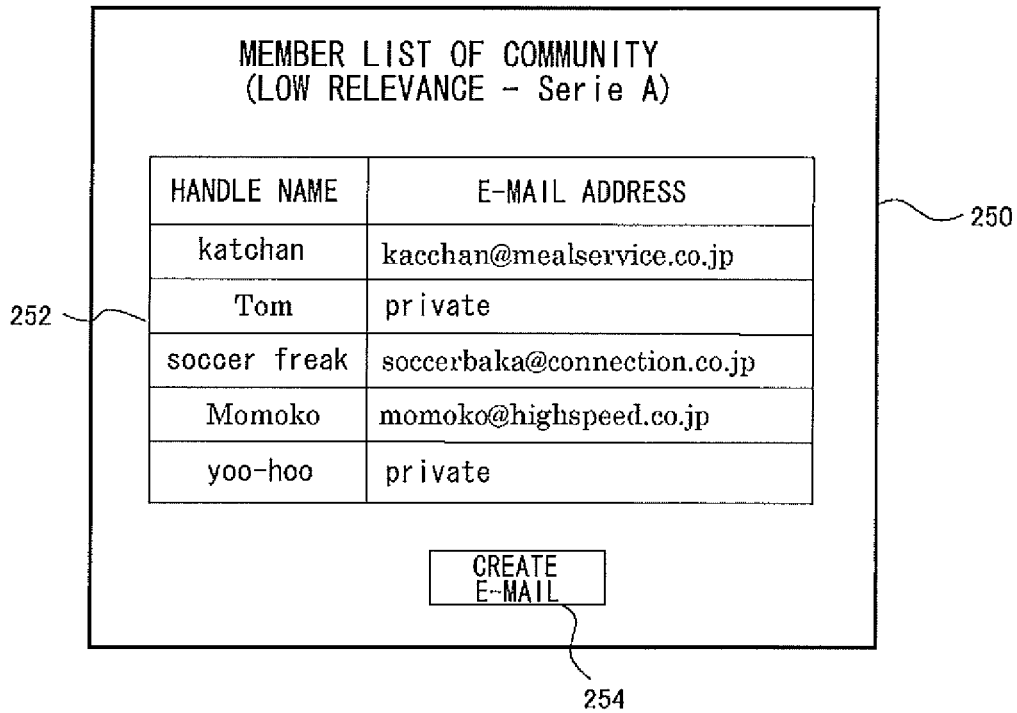
FIG. 13 shows one example of a screen which appears on the information terminal as a listing service of user information in the first embodiment.

FIG. 13 shows one example of a screen which appears when the listing service of user information of the community members is selected on the service selection screen 240 shown in FIG. 12. A member list screen 250 includes member information fields 252 and an e-mail creation button 254. This example shows the screen when the user selects the community established by the keyword "Serie A" on the community selection screen 230. Handle names and e-mail addresses in the information of the user identified by the user ID corresponding to the community of "Serie A," recorded in the community information table 340a shown in FIG. 6, appear in the member information fields 252. With the user who has not entered his/her e-mail address on the search reception screen 200 shown in FIG. 4, "private" is displayed in the e-mail address field. The information to be displayed in the member information fields 252 is not limited to the handle name and e-mail address, and may be any piece of information registered in the user information master 84. In this case, the member list screen 250 may allow the user to select which information is displayed. On the member list screen 250, the user selects one user from the member information fields 252 and then selects the e-mail creation button 254, so that an e-mail creation screen not shown in the drawing appears separately to create and send an e-mail to the selected user.

Figure 14:
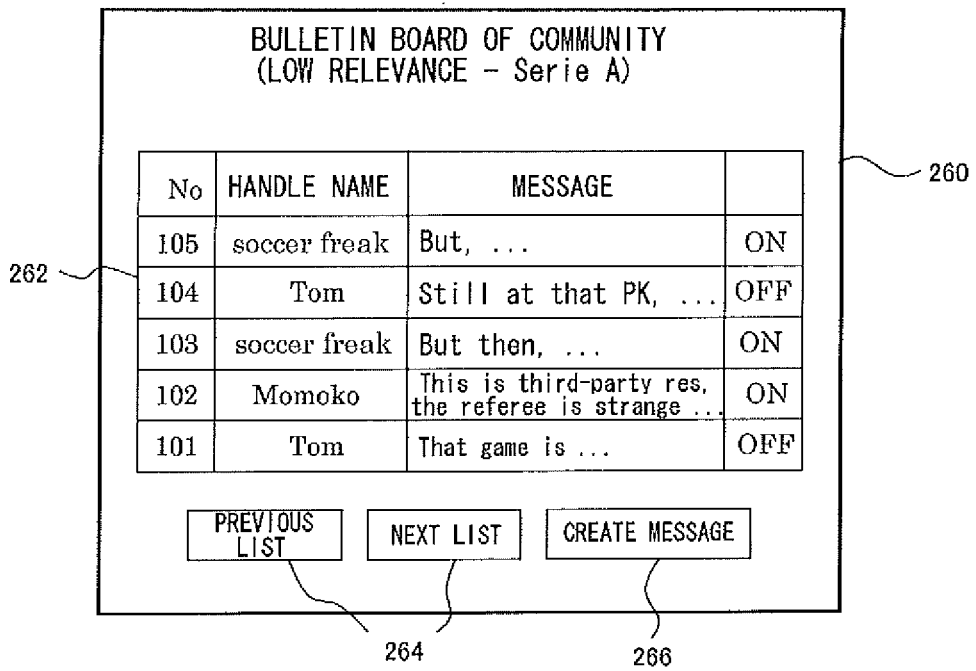
FIG. 14 shows one example of a screen which appears on the information terminal as an electronic bulletin board service in the first embodiment.

FIG. 14 shows one example of a screen which appears when the electronic bulletin board service is selected on the service selection screen 240 shown in FIG. 12. An electronic bulletin board screen 260 includes bulletin board fields 262, list paging buttons 264, and a message creation button 266. This example shows the screen when the user selects the community established by the keyword "Serie A," as shown in FIG. 13. The web server 52 of the community establishing site 50 establishes an electronic bulletin board which allows only the users of the selected community to read and write to, in a general manner, and presents and manages the electronic bulletin board screen 260 thereof. The example shown in FIG. 13 also shows "ON" and "OFF" which indicates whether the user who has written in the electronic bulletin board is currently connected to the network, in the right column of the bulletin board fields 262. The entered-information acquiring unit 62 of the community establishing server 60, which monitors the access status of the information terminal 20 of each user, enables such a display. The monitoring manner may be chosen from known monitoring manners that are suitable for the type of the information terminal and communication devices used therein. Selecting one of the list paging buttons 264 allows the user to track previous and next written texts.

Selecting the message creation button 266 causes a message creation screen not shown in the drawing to appear to allow the user to write in the electronic bulletin board. The electronic bulletin board screen 260 may allow the user to create and send an e-mail to a specified user by selecting one of the handle names shown.

Figure 15:
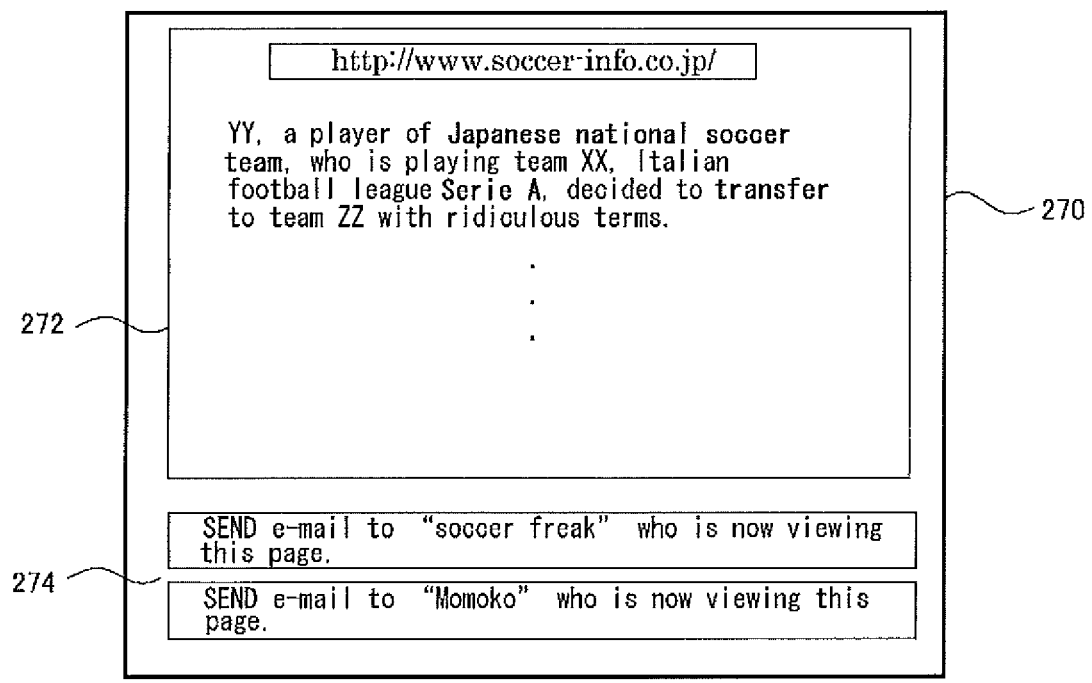
FIG. 15 shows another example of a screen which appears on the information terminal to allow the user to use a community establishing service in the first embodiment.

FIG. 15 shows another example of a screen which appears on the display unit 32 to allow the user to use a community establishing service. The screen example shown in FIG. 15 shows a wanted webpage after the user selects the URL, being the search result on the search result display screen 210 shown in FIG. 9. A webpage display screen 270 includes a webpage display window 272 and mail destination selection buttons 274. The webpage which is selected on the search result display screen 210 by the user appears in the webpage display window 272. At this time, the information terminal 20 accesses the corresponding website and the entered-information acquiring unit 62 of the community establishing server 60 monitors the access status.

In this embodiment, there is a high possibility that other users who belong to the same community browse the same webpage because the community is established by the users who have entered the same search keyword(s). Therefore, when monitoring the access status detects that the other users who belong to the same community are browsing the same webpage, the mail destination selection buttons 274 respectively with the handle names of the users appear to allow for the sending of an e-mail to the corresponding user. The user selects one of the mail destination selection buttons 274 based on the displayed handle names, and thereby an e-mail creation screen not shown in the drawing appears to allow for the creating and sending of an e-mail to the selected user. The other users displayed herein may include the members of all the communities to which the user belongs regardless of the relevance and keyword(s) or may be limited to the members of the communities which have been selected by the user. The community selection screens in this case may be the same as the screen examples shown in FIGS. 10 and 11.

According to the first embodiment described above, the search keyword(s) for the search which is entered into the information terminal by the user is recorded as a database in the community establishing site, and a community including the user and the other users who have searched with the same keyword(s) is automatically established. The established community is embodied for the user by various modes which allow the members to communicate with each other, such as the display of an e-mail address list, or an electronic bulletin board. This allows the user to participate in the community without having to search for the site related to his/her interest and thus this makes it easy to meet an unknown person on the network and exchange information. For example, there is a possibility that the user may discover a person who is available to discuss an uncommon interest, and it may be difficult to create a general community site or electronic bulletin board.

The keyword(s) used by the user is generally in relation to a matter in which the user is interested at the time. In the present embodiment, since establishing a community and searching form a set, the server monitors a user's interest matter without the user being aware and automatically establishes a community based on the result of that monitoring. This allows the user to have a low mental barrier of participation, compared with self-launching a community and voluntarily participating in an existing community. As a result, various communities continue to be established. Accordingly, the user can gain many opportunities by which unexpected rare information can be obtain as well as obtain search results through communication between members. Since the community information master, which is a community database, is updated every time the user enters a new search keyword, the community members are limited to the users who are interested in the keyword or keywords in real time. This results in increased activity in the community and provides many opportunities with which to exchange fresh information between the users. In this way, by monitoring the access status of a member to an electronic bulleting board or a webpage and providing the status of that member to the other members in the real-time established community, this allows the members to have real-time conversations with each other and therefore increases the opportunities with which to obtain information required in the variable information space over time.

Second Embodiment

Figure 16:
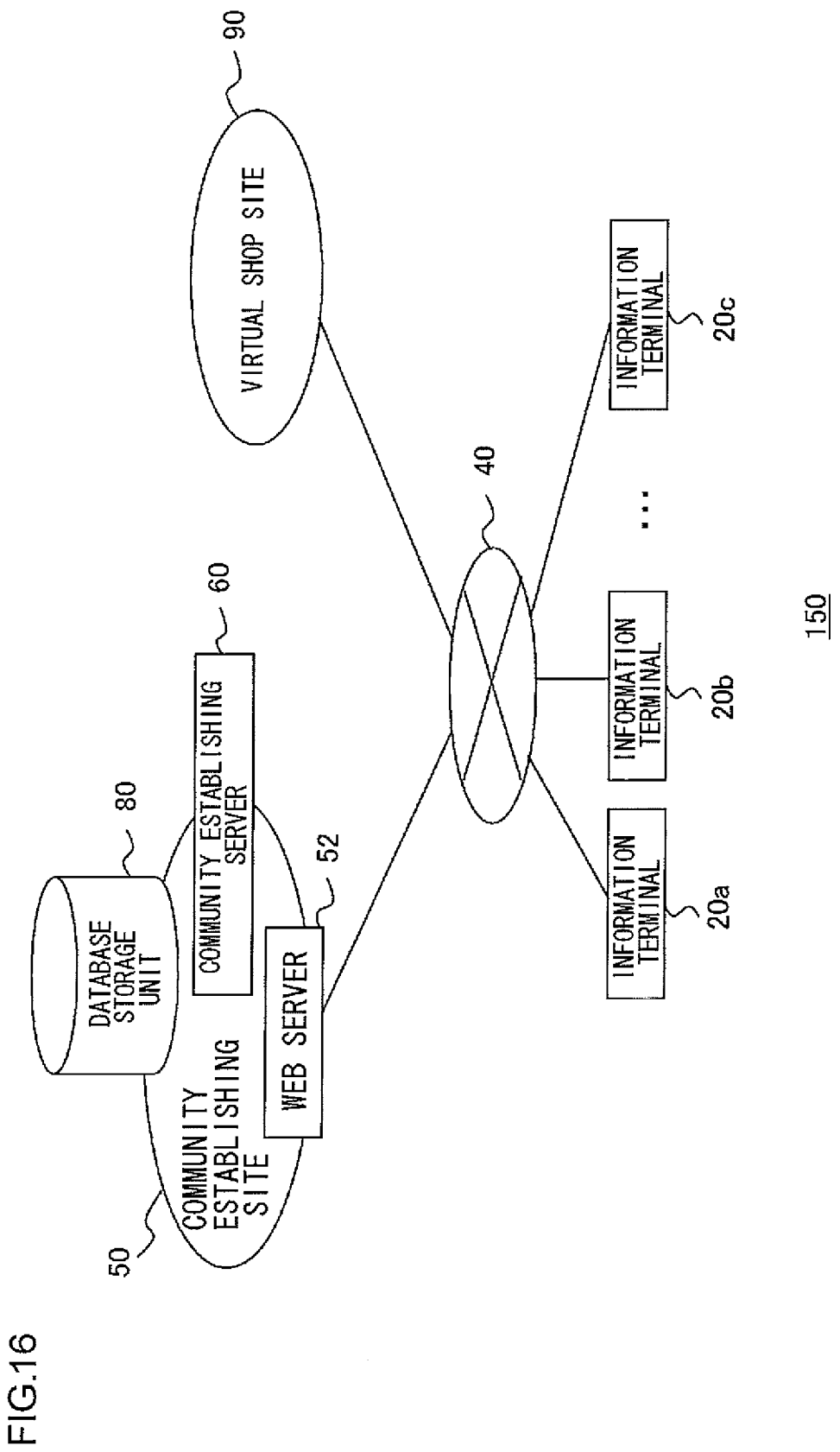
FIG. 16 is a diagram showing an entire configuration of an information processing system according to a second embodiment.

In the first embodiment, the community establishing site 50 automatically establishes a community using a keyword or keywords which is entered into the information terminal 20 when the user searches for a website and the like. In contrast, in a second embodiment, a community is established by a user's entry into a virtual mall or a virtual shop. FIG. 16 is a diagram showing a configuration of an entire information processing system according to the present embodiment. In the information processing system 150, the information terminal 20 and the community establishing site 50 have the same configuration as those of the first embodiment. In the present embodiment, a virtual shop site 90 is also connected to the network 40. Note that the virtual shop site 90 and the community establishing site 50 may be included in one site.

The detailed configurations of the community establishing site 50 and the information terminal 20 are the same as those shown in FIG. 2 in the first embodiment. Note that the entered-information acquiring unit 62 of the community establishing server 60 acquires information of shopping status in the virtual shop site 90, in other words, information such as selected goods and order status, as well as user information. In the present embodiment, a server (not shown in the drawing) of the virtual shop site 90 includes a block, corresponding to the site search unit 64, having a function, such as placement and acceptance of order, other than the community establishing service.

Figures 17, 18:
FIG. 17 shows one example of a screen which appears on the information terminal on access to a virtual shop in the second embodiment.
FIG. 18 shows one example of a screen which appears on the information terminal to allow the user to register for the community establishing service in a third embodiment.

The entered-information acquiring unit 62 of the community establishing server 60 acquires the information which is entered in the webpage when the user accesses the virtual shop site 90 using the information terminal 20. FIG. 17 shows one example of a screen which appears on the display unit 32 of the information terminal 20 on access to the virtual shop site 90. A virtual shop display screen 280 includes a virtual shop webpage display window 282 for displaying a webpage of the virtual shop site 90 accessed, and a community service use selection field 284. If the user selects "YES" to select use of the community establishing service in the community service use selection field 284, the subsequent entered-information in the virtual shop webpage display window 282 is used for establishing a community in the community establishing site 50. If the user selects "YES" to the use of the community establishing service, a pop-up window which allows the user to enter user information may appear as necessary.

With reference to FIG. 17, the information used for establishing a community in the present embodiment is, for example, the order of 'A ticket,' 'B ticket,' and 'A or B ticket' for the game on the date which appears in the virtual shop webpage display window 282. Alternatively, the information may be information such as how many minutes the webpage in the virtual shop webpage display window 282 appears for, and how many times access to the virtual shop site 90 is requested. A community to which the users who have such information in common belong as members is established. At the time, the community may be classified in such a manner that the community for the users who access the same virtual shop site 90 is a low relevance community, and the community for the users who order the 'A ticket' is a high relevance community.

When establishing a community, the community establishing site 50 transmits the data to the information terminal 20 so as to allow the user to show whether to participate in the community and to select the community in the same manner as in the first embodiment. In response to this, the information terminal 20 displays screens as shown in FIGS. 9 to 15. Therefore, the user can participate in the community in the same manner as in the first embodiment, through access to the virtual shop.

According to the second embodiment described above, the community establishing site acquires the entered-information into the information terminal when the user shops in the virtual shop site, and records the information as a database, thereby establishing a community. As a result, as detailed in the first embodiment, a community is automatically established using real-time information and the user easily participates in the community. Moreover, the users can directly exchange the information on goods, shops and the like therebetween.

Third Embodiment

In the first embodiment, the community establishing site serves as a search site as well, and the community establishing site automatically establishes a community based on the search keyword(s) entered by the user. In contrast, in a third embodiment, to establish a community, the community establishing site acquires the information when the user uses a network connecting service or e-mail delivery service provided by the community establishing site. In the present embodiment, the entire information processing system, the community establishing site 50, and the information terminal 20 have the same configuration as those shown in FIGS. 1 and 2 in the first embodiment. Note that the entered-information acquiring unit 62 of the community establishing server shown in FIG. 2 acquires the URL and access date of the website which the user has accessed, as well as the user information. In the present embodiment, the web server 52 includes a block, corresponding to the site search unit 64, having functions, such as connection of the information terminal 20 to the network and the transfer of an e-mail from the information terminal 20 to the destination address, other than the community establishing service.

FIG. 18 shows one example of a screen which appears on the display unit 32 of the information terminal 20 when the user who uses the network connecting service or the e-mail delivery service registers for the community establishing service. This registration may be created an initial entry when the user registers for the network connecting service and the like, or may be created by the user at any time. A community service registration screen 290 includes a selection boxes for using the community establishing service 292, user information fields 294, and a data submission button 296. The user decides whether to use the community establishing service by selecting one of the selection boxes for using the community establishing service 292. When deciding to use the community establishing service, the user enters in the user information fields his/her information such as sex, age, job, handle name, e-mail address, and keyword(s) shown in FIG. 18. The keyword(s) to be entered is, for example, a matter in which the user is presently interested. The keyword(s) can be changed by the user at any time, and is used for establishing a community in the same position as those shown in the first embodiment. When the data submission button 296 is selected, the entered information is transmitted from the information terminal 20 to the community establishing site 50.

FIG. 19 shows one example of a data structure of the user information to be registered in the user information master 84 by the community establishing server 60 based on the data, shown in FIG. 18, from the information terminal 20. A user information table 400 includes a user ID field 402, sex field 404, age field 406, job field 408, handle name field 410, e-mail address field 412, late access site field 414, access date field 416, and keyword field 418. The user ID unique to the user, and the information which is entered on the community service registration screen 290 by the user, including sex, age, job, handle name, e-mail address, and keyword(s) are registered in the user ID field 402, sex field 404, age field 406, job field 408, handle name field 410, e-mail address field 412, and keyword field 418, respectively. In addition to this, when the user accesses a website, the entered-information acquiring unit 62 acquires the URL of the website and the access date to such, and thus the late access site field 414 and access date field 416 are updated.

A community is established based on the websites accessed by the user, using a constructed database having the structure shown in FIG. 19. The entered-information acquiring unit 62 may acquire a noun or the like which appears frequently in the body of the e-mail transmitted by the user, and automatically update the keyword field 418 with the noun or the like as the keyword. Accordingly, a community to which the users having the website accessed and keyword(s) entered in common belong to as members is established. When establishing a community, the community establishing site 50 transmits the data to the information terminal 20 so as to allow the user to show whether to participate in the community and to select the community in the same manner as in the first embodiment. In response to this, the information terminal 20 displays screens as shown in FIGS. 9 to 15. Therefore, the user can participate in the community in the same manner as in the first embodiment, through access to the website or by sending of an e-mail.

According to the third embodiment described above, the entered-information acquiring unit acquires the information when the user accesses a website or sends an e-mail, and records the information as a database, thereby establishing a community. As a result, as detailed in the first embodiment, a community is automatically established through operation user easily performs on a routine basis, and the user easily participates in the community. The user can therefore potentially obtain unexpected information and communicate with an unknown person. By allowing the user to update the keyword(s) by oneself, this reflects the user's intention to the automatically-established community shown in the first embodiment, thereby resulting in the selection of a flexible embodiment suitable for various users' needs.

Described above is an explanation based on the embodiments. The embodiments are only illustrative in nature and it will be obvious to those skilled in the art that variations in constituting elements and processes are possible within the scope of the present invention.

For example, in the embodiments, the information entered into the information terminal when the user searches for website, does shopping in the virtual shop, accesses a website, and sends an e-mail, is acquired and a community is established based on the information. This concept is applicable to any types of entry if the entry is to the information terminal being connected to the network. For example, an article viewed in a website which provides news browsing service, and an object viewed by and location of a character representing a user in a virtual space which is formed in the information terminal through the network, may be acquired, or the user may be prompted to enter current mind-set and state. The feature points of the current user's state, which is acquired by a surveillance camera or sensor, may be extracted. In either case, the community establishing server may record the information as database, and extract users who have a commonality, thereby establishing a community. This can provide the same advantages as the embodiments such as easy establishment and participation of community, and provide a game-like mode in which an unexpected community with a commonality, without the user being aware, is established as a few features are extracted from the entered-information. The community may not always be configured by the users who have a commonality, and may be established following a predetermined rule, for example, in which the users being in an opposite situation belong to a same community. In this case, the user can decide whether he/she finally participates in a wanted community.

When the community is established, predetermined restriction may be set on the users to be registered as members. The restriction may be, for example, that only the users over a predetermined age are members, wherein the user's age is obtained by reference to the user information. The users using a different language may be members of the same community by translating the keyword(s) entered by the user with a translation function, which is provided to the community establishing server. These options allow the establishment of a more safe and borderless community.

Furthermore, in the embodiments described above, the listing of information of the other members of the community selected by the user and the electronic bulletin board which allows only the members to access are shown as modes that the user participates in the community, but the present invention is not limited thereto. For example, only the number of members in the established community may be displayed, or the relation between job or sex and the number of corresponding members may be displayed. Therefore, the established community can be used for not only communication between the members but also for providing marketing and statistical data. Avatars which show the other members may appear and act, in addition to the display of text. Furthermore, the present invention is applicable to games, for example, in such a manner that game characters which show the other members may appear and directly communicate with the user's character. In this way, the present invention is applicable to any one of many broad applications, from a game-like mode to a statistical mode, which is selected accordingly, and can provide applications suitable for users needs.

The present invention is usable for electronic appliance such as computers, game machines, and mobile phones.

What is claimed is:

1. An information processing method comprising:
   acquiring a plurality of keywords through a network by a server, the keywords having been entered into respective information terminals by, and transmitted over the network via respective searches of, a plurality of users;
   storing the keywords;
   associating each keyword of the plurality of keywords with respective user identity information of the users who entered each keyword;
   establishing a plurality of communities, each community including at least two of the users who have each entered at least a same one of the plurality of keywords in a single search, each respective community being assigned a relevance that varies in accordance with a number of keywords that match in a single search by the users of the respective community;
   monitoring a connection status of the users, the connection status indicating webpages being accessed after the searches by the information terminals of the users;
   receiving a selection of one of the communities by one of the users of the community;
   transmitting the user identity information of other users who belong to the selected community to the one user when the other users are simultaneously browsing a same webpage as the one user, the webpage not providing communication service between users and not being generated by a web site to which the server belongs, and the user identity information including at least data for avatars of the other users; and
   transmitting information for displaying a communication service window comprising the user identity information of the other users and for displaying a widow comprising the webpage to the at least one user.

2. The information processing method according to claim 1, wherein the transmitting step transmits the user information that includes information concerning a communicating means to communicate with the other users.

3. An information processing system, comprising:
   a server which exchanges information with respective information terminals of a plurality of users through a network, the server including:
   a user information storage unit which stores identification information of the users as user information,
   a data acquiring unit which acquires a plurality of keywords entered into the information terminals via respective searches of the users, and after the searches monitors connection status which indicates which of the information terminals are connected to the network and the one or more webpages accessed by the information terminals, the webpages not providing communication service between users and not being generated by a site to which the server belongs;
   a data storage unit which stores the plurality of keywords acquired by the data acquiring unit so as to associate each of the plurality of keywords with respective user information of the users who entered each keyword;
   a community establishing unit which establishes a plurality of communities, each community including at least two of the users who have each entered at least a same one of the plurality of keywords in a single search, each respective community being assigned a relevance that varies in accordance with a number of keywords that match in a single search by the users of the respective community;
   a receiving unit which receives a selection of one of the communities by one of the users of the community; and
   a transmitting unit which transmits information concerning the selected community established by the community establishing unit to the information terminal of the one user, the transmitting unit transmits the user identity information of other users who belong to the selected community to the information terminal operated by the one user such that the information terminal may display a communication service window comprising the user identity information of the other users who are simultaneously browsing a same webpage as the one user, the user identity information including at least data for avatars of the other users.

4. The information processing system according to claim 3, wherein the keywords in the data storage unit are updated every time one or more of the users enters a new keyword in a new search.

5. The information processing system according to claim 4, wherein the community establishing unit establishes a new community concerning the new keyword every time the keywords stored in the data storage unit are updated, and deletes a user who has entered the new keyword from the one or more communities to which the user belongs before the entering of the new keyword.

6. The information processing system according to claim 4, wherein:
the data storage unit stores the plurality of keywords so as to associate each keyword with a respective entry time at which each keyword is entered, and
when a given keyword stored in the data storage unit is not updated for a predetermined time after the entry time, the community establishing unit deletes a corresponding user of such given keyword from the one or more communities to which the corresponding user previously belongs via such given keyword.

7. The information processing system according to claim 3, wherein the transmitting unit transmits e-mail address of the other user who belong to the community to the information terminal.

8. The information processing system according to claim 3, wherein:
the data acquiring unit further acquires a keyword which is contained in an e-mail with at least a predetermined frequency when the user transmits the e-mail, as the data,
the community establishing unit further establishes the plurality communities for users who have contained at least one same keyword in an e-mail.

9. A server comprising:
a user information storage unit which stores identity information of users as user information, each user operating a respective information terminal connected to the server through a network;
a data acquiring unit which acquires a plurality of keywords entered into the information terminals via respective searches of the users;
a data storage unit which stores the plurality of keywords acquired by the data acquiring unit so as to associate each of the plurality of keywords with the user information of the users who entered each keyword;
a community establishing unit which establishes a plurality of communities, each community including at least two of the users who have each entered at least a same one of the plurality of keywords in a single search, each respective community being assigned a relevance that varies in accordance with a number of keywords that match in a single search by the users of the respective community;
a receiving unit which receives a selection of one of the communities by one of the users of the community; and
a transmitting unit which transmits, to the information terminal operated by the one user, user identity information of other users who participate in the selected community, where the user identity information including at least data for avatars of the other users, wherein:
the data acquiring unit further monitors, after each search, connection status which indicates which webpages each information terminal is accessing, the webpages do not provide communication service between users and are not generated by a site to which the server belongs, and
the transmitting unit transmits, to the information terminal of the one user, user identity information of the other users who are simultaneously browsing a same webpage as that browsed by the one user, for displaying a communication service window presenting the one user with identity information of the other users along with a window including the webpage.

10. A computer readable recording medium which stores a computer program product, comprising:
a module which stores identity information concerning users as user information, each user operating a respective information terminal connected to the server through a network;
a module which acquires a plurality of keywords entered into the information terminals via respective searches of the users;
a module which stores the plurality of keywords so as to associate each of the plurality of keywords with the user information of the users who entered each keyword;
a module which establishes a plurality of communities, each community including at least two of the users who have each entered at least a same one of the plurality of keywords in a single search, each respective community being assigned a relevance that varies in accordance with a number of keywords that match in a single search by the users of the respective community;
a module which receives a selection of one of the communities by one of the users of the community; and
a module which transmits, to the information terminal operated by the one user, user identity information of other users who participate in the selected community, where the user identity information including at least data for avatars of the other users, wherein:
the module which acquires the data further monitors, after each search, connection status which indicates which webpages each information terminal is accessing, the webpages do not provide communication service between users and are not generated by a site to which the server belongs, and
the module which transmits the user information transmits, to the information terminal of the one user, the user information of the other users who are simultaneously browsing a same webpage as that browsed by the one user, for displaying a communication service window presenting the user information of the other users and the webpage at the information terminal of the one user.

11. An information processing method comprising:
acquiring user-entered data indicating a keyword through a network from a plurality of users;
associating each keyword with respective user information of the user who has entered the user-entered data indicating the same keyword;
establishing a plurality of communities of users from among the plurality of users based on the association, each community including at least two of the users who have each entered at least a same one of the plurality of keywords in a single search, each respective community being assigned a relevance that varies in accordance with a number of keywords that match in a single search by the users of the respective community:
transmitting user information including names, avatars or jobs of users who belong to a given one of the communities, for simultaneous displaying on a screen of an information terminal of one of the users of the given community: (i) the keyword associated with the community, (ii) a community member information field in which the transmitted user information is displayed, and (iii) a number of members in the given community, wherein the respective community member information is dynamically established according to further user-entered data.

12. The information processing method according to claim 11, wherein the acquiring step includes acquiring, together with the user-entered data, an input for confirming the one user's intent to use the given community, and for user information entered on an entry screen.

13. The information processing method according to claim 11, wherein one other user can be selected from the community member information field on the screen by the one user, and a message creation screen separately appears, upon selection of a message creation button, to create and send an message to the selected one other user.

14. The information processing method according to claim 11, wherein the establishing step includes establishing a community for only users over a predetermined age restriction.

15. The information processing method according to claim 11, wherein the establishing step comprises translating keywords entered by users using different languages so as to establish a community based on the same keyword even in different languages.

16. A server comprising:
a data acquiring unit for acquiring user-entered data indicating a keyword through a network from a plurality of users;
a data storage unit which stores keywords each of which is associated with respective user information of the users who have entered the user-entered data indicating the keywords;
a community establishing unit which establishes a plurality of communities of users from among the plurality of users by associating users who have entered data indicating the same keywords, each community including at least two of the users who have each entered at least a same one of the plurality of keywords in a single search, each respective community being assigned a relevance that varies in accordance with a number of keywords that match in a single search by the users of the respective community:
a transmitting unit for transmitting user information including names, avatars or jobs of users who belong to a given one of the communities, for simultaneous displaying on a screen of an information terminal of one of the users of the given community: (i) the keyword associated with the community, (ii) a community member information field in which the transmitted user information is displayed, and (iii) a number of members in the given community,
wherein the respective community member information is dynamically established according to further user-entered data.

17. The server according to claim 16, wherein the data acquiring unit acquires, together with the user-entered data, an input for confirming the one user's intent to use the community, and for user information entered on an entry screen.

18. The server according to claim 16, wherein one other user can be selected from the community member information field on the screen by the one user, and a message creation screen separately appears, upon selection of a message creation button, to create and send an message to the selected one other user.

19. The server according to claim 16, wherein the community establishing unit establishes a community for only users over a predetermined age restriction.

20. The server according to claim 16, wherein the community establishing unit translates keywords entered by users using different languages so as to establish a community based on the same keyword even in different languages.

21. An information terminal comprising:
a communication unit which transmits user-entered data from one user, among a plurality of users, indicating a keyword to a server through a network and obtains, from the server, user information including names, avatars or jobs of users who belong to a given community which is established by the server through associating users who have entered data indicating a same keyword;
a display unit which simultaneously displays on a screen: (i) the keyword associated with the community, (ii) a community member information field in which the user information is displayed, and (iii) a number of members in the established community, each community including at least two of the users who have each entered at least a same one of the plurality of keywords in a single search, each respective community being assigned a relevance that varies in accordance with a number of keywords that match in a single search by the users of the respective community,
wherein the community member information is dynamically established according to further user-entered data from among the plurality of users.

22. The information terminal according to claim 21, wherein the communication unit transmits, together with the user-entered data, an input for confirming the one user's intent to use the community, and for user information entered on an entry screen.

23. The information terminal according to claim 21, wherein the display unit displays the community member information field so that one other user can be selected from the community member information field by the one user, and a message creation screen separately appears, upon selection of a message creation button, to create and send an message to the selected one other user.

24. The information terminal according to claim 21, wherein only users over a predetermined age restriction belong to the community established by the server.

25. The information terminal according to claim 21, wherein the community established by the server is based on the same keyword even in different languages.

* * * * *